| United States Patent [19]
McCray

[11] Patent Number: 4,978,455
[45] Date of Patent: * Dec. 18, 1990

[54] P-XYLYLENEDIAMIDE/DIIMIDE COMPOSITE RO MEMBRANES

[75] Inventor: Scott B. McCray, Bend, Oreg.

[73] Assignee: Bend Research, Inc., Bend, Oreg.

[ * ] Notice: The portion of the term of this patent subsequent to Aug. 1, 2006 has been disclaimed.

[21] Appl. No.: 320,291

[22] Filed: Mar. 6, 1989

Related U.S. Application Data

[63] Continuation-in-part of Ser. No. 98,201, Sep. 15, 1987, Pat. No. 4,853,122.

[51] Int. Cl.$^5$ .............................................. B01D 69/00
[52] U.S. Cl. ................................ 210/654; 210/500.39; 210/500.41

[58] Field of Search ............... 210/321.89, 490, 500.39, 210/500.41, 500.38, 654, 500.37; 521/27

[56] References Cited

U.S. PATENT DOCUMENTS 4,355,116  10/1982  Lee et al. .............................. 521/27
4,853,122  8/1989  McCray .......................... 210/321.89

Primary Examiner—Frank Sever
Attorney, Agent, or Firm—Chernoff, Vilhauer, McLung & Stenzel

[57] ABSTRACT

Composite RO membranes having good resistance to halogen attack and high fluxes are disclosed, the composite membranes comprising a microporous polymeric support with an interfacially polymerized salt-rejecting layer thereon comprising an aromatic aliphatic diamide/diimide.

7 Claims, No Drawings

P-XYLYLENEDIAMIDE/DIIMIDE COMPOSITE RO MEMBRANES

The government has rights in this invention under Department of Defense Contract No. DAAK-70-85-C-0059.

This is a continuation-in-part of application Ser. No. 098,201, filed Sept. 15, 1987 now U.S. Pat. No. 4,853,122.

BACKGROUND OF THE INVENTION

Reverse osmosis (RO) membranes are known but there is still a need in the art for RO membranes that are resistant to degradation by halogens such as chlorine, which is often present in the feed waters of an RO process stream. There is also an ongoing need in the art for membranes with high salt rejection and flux rates.

One method of making RO membranes is by interfacial polymerization of a salt-rejecting layer on a porous polymeric support so as to form a composite membrane. See, for example, U.S. Pat. No. 4,039,440. Another method is by crosslinking polyamides or polyhydrazides having carbonyl and/or sulfonyl groups and having pendant ionic groups with metal salts. See U.S. Pat. No. 4,086,215. Meta-xylylenediamine has been condensed with trimesoyl chloride in an interfacial polymerization reaction on a polysulfone support so as to form a meta-xylylenediamide composite RO membrane. See NTIS Report No. PB83-243170 entitled "Novel Composite Membranes" by Eric K. L. Lee, et al. dated April 1983. However, the membranes so prepared were not useful for practical desalination applications due to their poor chlorine resistance and low fluxes (on the order of 6 to 10 gfd for those with salt rejections of 95% or better).

SUMMARY OF THE INVENTION

The novel RO membranes of the present invention are composite membranes comprising a paraaromaticaliphatic diamide or diimide salt-rejecting layer interfacially polymerized on a microporous polymeric support.

DETAILED DESCRIPTION OF THE INVENTION

According to the present invention, novel composite RO membranes are provided that possess good chlorine resistance, high salt rejection and extraordinarily high fluxes, the membranes comprising an interfacially-polymerized salt rejection layer on a microporous polymeric support. The salt-rejecting layer is the interfacial polymerization reaction product of a mixture of aromatic polyacylhalides comprising a mixture of trimesoyl chloride (TMC) and isophthaloyl chloride (IPC) containing $\geq 20$ wt % TMC and an aromatic diamine or diimine of the general formula

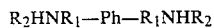

$$R_2HNR_1—Ph—R_1NHR_2$$

where Ph is a para-substituted phenylene group, $R_1$ is an alkylene group containing from 1 to 2 carbon atoms, and $R_2$ is hydrogen or an alkyl group containing from 1 to 2 carbon atoms.

The microporous polymeric support may be in the form of flat sheets or hollow fibers and may be selected from polysulfones, polyethersulfones, polyphenylsulfones, polyvinylidenehalides, including polyvinyl chloride, polyimides and polyetherimides, polyamides, polyesters, and polycarbonates. Such supports are available commercially in flat sheets typically 2 to 6 mils thick.

Preferred hollow fiber supports typically have an internal diameter of 260 microns and an external diameter of 620 microns. The salt-rejecting layer may be formed on either the inner or lumens side of such hollow fibers or on the outer or external side of the fiber.

Flat sheet support membranes may be prepared by machine casting in accordance with known prior art methods. Hollow fiber support membranes may also be prepared according to known methods of hollow fiber spin casting.

The composite membrane of the present invention is typically prepared by first immersing the support membrane in an aqueous solution of the diamine or diimine for a short period of time, preferably 1 to 3 minutes, removing it from the aqueous and draining it of excess solution, then immersing it in a dilute solution of a cross-linking agent in an organic solvent at ambient temperatures for less than one minute to form the interfacial polymer on the support. The composite membrane so formed is air-dried, then heat-cured at temperatures in the range of 40° C. to 120° C. for about 10 minutes to complete the reaction. The aqueous solution should contain from about 0.25 wt % to about 5 wt % of the amine or imine, 0.5 wt % to 2 wt % being preferred, together with additives of a triethylamine (functioning as an acid scavenger), and a surfactant. The organic phase should contain from about 0.01 wt % to about 1.0 wt % of the cross-linking agent, preferably 0.05 wt % to about 0.5 wt %.

The preferred reactants in forming the salt-rejecting layer of the composite membrane of the present invention are para-xylylenediamine (pXDA) and a mixture of TMC and IPC, containing $\geq 20$ wt % TMC.

The general class of composite RO membranes prepared according to the present invention exhibit salt rejections in excess of 95%, good chlorine resistance and fluxes of about 15 to 40 gfd, making them especially suitable for desalination of sea water by RO.

EXAMPLES 1–5

A series of composite membranes of the present invention were prepared as follows. An asymmetric microporous polysulfone support flat sheet membrane approximately 4 mils thick and having microporosity on one side was immersed in a 2 wt % aqueous solution of pXDA containing 0.5 wt % triethylamine (as an acid scavenger) and 0.01 wt % of a surfactant sold under the trade name "Iconol NP-9" (BASF Wyandotte Corporation of Parsippany, New Jersey), drained of excess solution, then immersed in a 0.5 wt % solution of pure TMC in hexane for 30 seconds at room temperature, causing formation of a para-xylylenediamide film on the microporous surface of the polysulfone support. The resulting composite membrane was air-dried at room temperature overnight, then heat-cured for 10 minutes at 100° C. The so-formed membrane was then tested in an 800 psi RO test, the feed water containing 0.5 wt % NaCl at pH 6.0 and 25° C. The results, with flux being expressed in gallons per square foot of membrane surface area per day (gfd), are shown in Table I.

TABLE I

| Membrane/Example No. | Flux (gfd) | Rejection (%) |
| --- | --- | --- |
| 1 | 19.5 | 96.4 |

TABLE I-continued

| Membrane/Example No. | Flux (gfd) | Rejection (%) |
|---|---|---|
| 2 | 23.4 | 95.8 |
| 3 | 20.9 | 96.9 |
| 4 | 23.5 | 96.6 |
| 5 | 23.1 | 96.5 |

EXAMPLES 6-13

Composite membranes prepared in essentially the same fashion as those in Examples 1-5 with the exceptions noted were prepared in batches of three membranes at a time, and RO-tested, the average results of each group of three being as noted in Table II.

TABLE II

| Membrane/Example No. | pXDA (wt %) | TMC (wt %) | Heat Cure (°C.) | Flux (gfd) | Rejection (%) |
|---|---|---|---|---|---|
| 6 | 2 | 0.1 | 100 | 20.5 | 99.0 |
| 7 | 2 | 0.5 | 100 | 22.1 | 96.4 |
| 8 | 2 | 0.1 | 60 | 26.6 | 98.8 |
| 9 | 2 | 0.5 | 60 | 21.6 | 98.1 |
| 10 | 2 | 0.05 | none | 20.6 | 97.5 |
| 11 | 0.5 | 0.1 | 60 | 25.5 | 97.2 |
| 12 | 2 | 0.1 | 60 | 36.6 | 97.1 |
| 13 | 1 | 0.1 | 60 | 42.8 | 96.4 |

EXAMPLE 14

Chlorine resistance of an exemplary membrane prepared in essentially the same fashion as in Examples 1-5 was tested by subjecting the membrane to the same type of RO test conditions as set forth in Examples 6-13 for 40 days except that the pH was 4.5 and the feed water contained either 0, 0.5 or 10 ppm free chlorine in the form of NaOCl. In order to accelerate the effects of chlorine on the performance of the membrane, the test was run in an "on/off" scheme of six hours of chlorine-containing feed/18 hours of chlorinefree feed with a rinse of the membrane after each chlorination cycle. The results, taken in each instance after exposure to chlorine, are shown in Table III.

TABLE III

| Day No. | Chlorine (ppm) | Flux (gfd) | Rejection (%) |
|---|---|---|---|
| 0 | 0 | 14.5 | 97.2 |
| 5 | 10 | 3.6 | 98.2 |
| 10 | 10 | 3.8 | 98.8 |
| 17 | 10 | 2.8 | 98.6 |
| 19 | 0.5 | 4.2 | 98.0 |
| 24 | 10 | 4.5 | 98.1 |
| 28 | 0.5 | 3.4 | 97.0 |
| 35 | 10 | 3.5 | 97.0 |
| 40 | 10 | 3.3 | 97.0 |

Examples 15-17

A series of composite membranes of the present invention were prepared from mixtures of TMC and IPC as follows. An asymmetric microporous polysulfone support flat sheet membrane approximately 4 mils thick and having microporosity on one side was immersed in a 1 wt % aqueous solution of pXDA containing 0.5 wt % triethylamine (as an acid scavenger) and 0.01 wt % of the surfactant Iconol NP-9, drained of excess solution, then immersed in a 0.25 wt % solution of three mixtures of 0.25 wt % TMC and IPC in hexane containing TMC in amounts of 24 wt % (Example 15), 50 wt % (Example 16), and 76 wt % (Example 17), based upon the combined amounts of TMC and IPC. The immersion was for 30 seconds at room temperature, causing formation of a para-xylylenediamide film on the microporous surface of the polysulfone support. The three resulting composite membranes were each air-dried at room temperature overnight, then heat-cured for 10 minutes at 60° C. The so-formed membranes were then RO-tested in the same manner as in Examples 1-5. The results are shown in Table IV.

TABLE IV

| Example No. | Flux (gfd) | Rejection (%) |
|---|---|---|
| 15 | 14 | 97.4 |
| 16 | 21 | 98.5 |
| 17 | 31 | 97.5 |

Based upon their similarity in chemical structure to the membranes of Examples 1-13, the so-prepared membranes exhibit excellent resistance to chlorine attack.

EXAMPLE 18

To show the importance of at least 20 wt % TMC in the mixture of TMC and IPC, a composite membrane was prepared in the identical manner as in Examples 15-17 except that, instead of a mixture of TMC and IPC, nothing but 0.25 wt % of pure IPC in hexane was used as the aromatic polyacylhalide. The so-prepared membrane was tested under the same conditions as in Examples 15-17 and, although its flux was 14 gfd, salt rejection dropped to 25.9%.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A composite membrane comprising:
   (a) a microporous polymeric support; and
   (b) an aromatic aliphatic diamide/diimide membrane formed on said support by interfacial polymerization of
      (i) a mixture of trimesoyl chloride and isophthaloyl chloride containing ≧20 wt % trimesoyl chloride, and
      (ii) an aromatic aliphatic amine/imine of the formula $R_2HNR_1$—Ph—$R_1NHR_2$

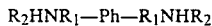

where Ph is a para-substituted phenylene group, $R_1$ is an alkylene group containing from 1 to 2 carbon atoms, and $R_2$ is hydrogen or an alkyl group containing from 1 to 2 carbon atoms.

2. The membrane of claim 1 wherein the microporous polymeric support is selected from polymicroporous sulfones, polyethersulfones, polyphenylsulfones, polyvinylidenehalides, polyimides and polyetherimides, polyamides, polyesters, and polycarbonates.

3. The membrane of claim 1 wherein the aromatic aliphatic amine/imine is para-xylylenediamine.

4. The membrane of claim 3 wherein the support is a hollow fiber and the membrane is formed on the inside of said hollow fiber.

5. The membrane of claim 1 wherein the support is selected from flat sheets and hollow fibers.

6. The membrane of claim 5 wherein the support is a hollow fiber and said membrane is formed on the outer surface of said hollow fiber.

7. In a process for desalination of saline water by reverse osmosis comprising contacting the saline water under pressure with a reverse osmosis membrane, the improvement comprising using as the reverse osmosis membrane the membrane of claim 1, 2, 3 or 5.

* * * * *

UNITED STATES PATENT AND TRADEMARK OFFICE
CERTIFICATE OF CORRECTION

PATENT NO. : 4,978,455

DATED : December 18, 1990

INVENTOR(S) : Scott B. McCray

It is certified that error appears in the above-identified patent and that said Letters Patent is hereby corrected as shown below:

Col. 3, Line 39: Change "chlorinefree to -- chlorine-free --

Col. 4, Lines 60-61: Change "polymicroporous sulfones" to -- polysulfones --

Signed and Sealed this

Twenty-eighth Day of July, 1992

Attest:

DOUGLAS B. COMER

*Attesting Officer*   Acting Commissioner of Patents and Trademarks